United States Patent [19]
Trapp et al.

[11] 4,208,101
[45] Jun. 17, 1980

[54] IMMERSION OBJECTIVE FOR A MICROSCOPE

[75] Inventors: Lothar Trapp; Rudolf Conradi, both of Heidenheim, Fed. Rep. of Germany

[73] Assignee: Carl Zeiss-Stiftung, Oberkochen, Fed. Rep. of Germany

[21] Appl. No.: 855,675

[22] Filed: Nov. 29, 1977

[30] Foreign Application Priority Data

Dec. 4, 1976 [DE] Fed. Rep. of Germany ....... 2655041

[51] Int. Cl.² .............................................. G02B 21/02
[52] U.S. Cl. ............................. 350/175 ML; 350/179
[58] Field of Search ................. 350/175 ML, 179, 255

[56] References Cited
U.S. PATENT DOCUMENTS

| | | | |
|---|---|---|---|
| 1,954,755 | 4/1934 | Heine | 350/175 ML |
| 2,533,371 | 12/1950 | Heine | 350/175 ML |
| 4,072,408 | 2/1978 | Uetake et al. | 350/255 |

FOREIGN PATENT DOCUMENTS 603 of 1878 United Kingdom ..................... 350/179

Primary Examiner—Conrad J. Clark
Attorney, Agent, or Firm—Hopgood, Calimafde, Kalil, Blaustein & Lieberman

[57] ABSTRACT

The invention contemplates a multiple-element microscope objective assembly which is removably mountable to a microscope body and which includes a front element adapted for immersion contact with a liquid medium through which a microscopic object is to be observed. The invention features an externally accessible control adjustment for selectively axially positioning one of the optical elements of the objective with respect to the rest of the assembly such that a corrective optical adjustment is made for such change in refractive index as may characterize the use of one vs. another liquid-immersion substance, thereby enabling the microscope to preserve its normal focusing action consistently for use of the objective with a plurality of different immersion substances having different refractive indices.

11 Claims, 3 Drawing Figures

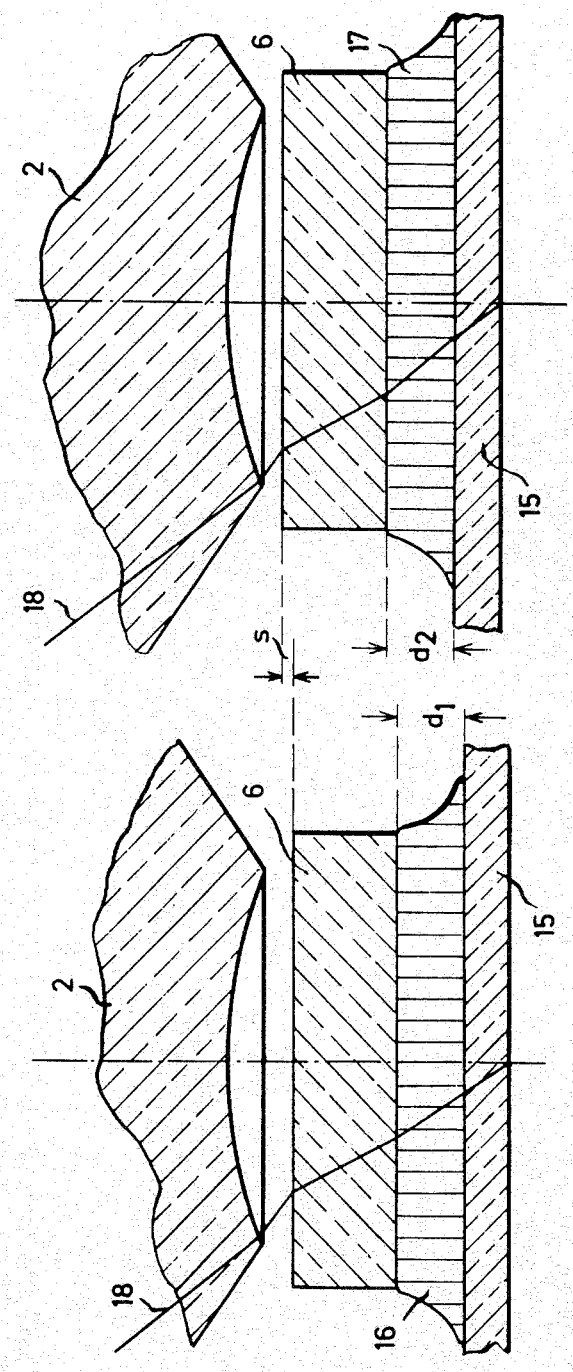

IMMERSION OBJECTIVE FOR A MICROSCOPE

This invention relates to an immersion objective for a microscope for use with a plurality of optically different immersion substances.

An immersion objective is defined as a microscope objective which includes a front element adapted for immersion contact with a liquid medium through which a microscopic object is to be observed. By said immersion contact the liquid medium completely fills the space between said front element of the objective, and, with covered objects, the cover glass, or, with uncovered objects, the object itself. Through the use of immersion media, it is possible to compute microscope objectives having a high numerical aperture with values larger than 1 (one).

There are various immersion media the best known of which are glycerine and cedar oil. Each of these media has a different index of refraction. With objectives of higher aperture, the image quality depends to a high degree on the optical medium between the front element of the objective. For this reason, immersion objectives are corrected for a specific immersion medium, i.e., a certain object type is provided in several examples for use with a different immersion medium. When using such an objective, corrected for a certain immersion medium, e.g., oil (n=1.52), with an immersion medium of lower index of refraction, e.g., water (n=1.33), image errors, particularly spherical aberration, result which already with medium-strength objectives lead to an intolerable deterioration of image quality.

Even with dry objectives, i.e., microscope objectives which are used without immersion medium, the image quality of higher-aperture objectives depends greatly on the thickness of the object cover glass used. The cover glass thickness is standardized at 0.17 mm and the objectives are computed and corrected precisely on the basis of this value. In order not to have to restrict the cover glass thickness of specimens with dry objectives of higher aperture to dimension deviations which are too small and cannot as a rule be maintained, there are known correction mounts which permit adaptation to a plurality of cover glasses, the thickness of which deviate from said standardized thickness by varying the distance of optical components within the objective.

With such so-called correction mounts, the front lens and another lens group of the microscopic objective ordinarily are made displaceable relative to each other in the direction of the optical axis. The shifting of these lens groups relative to each other affects the spherical correction of the objective in such a way as to permit correction of the spherical aberration, caused by the deviation of the thickness of the cover glass used from the standard thickness. However, there result other image errors, such as coma, color errors, astigmatism which have to be accepted.

Such correction mounts previously were used only for adjustment to the thickness of the cover glass used.

There is known in the art a microscope objective for vertical illumination where the image-forming system is surrounded by a ring-shaped condenser through which the light is directed to the specimen. In order to avoid disturbing reflections, there is located in front of the front lens of the objective a plane-parallel conically restricted glass plate whose thickness is at least that of the front lens. This plate is brought in contact with the specimen and thus directs the illumination optical path to the specimen in such a way that only the spot to be observed is illuminated, without producing disturbing reflections impairing the image contrast. The front glass plate permits illumination and observation of objects covered by a thick liquid layer, in that the plate is immersed in the liquid and directs the illumination optical path to the object directly and without disturbing surface reflections.

The object of the present invention is to provide an immersion objective for a microscope which can be used with a plurality of optically different immersion substances, thereby reducing the large number of different microscope objectives designed for a specific immersion substance, but similar in design, without restricting the application of the immersion objectives.

The object of the present invention is achieved by means of an objective comprising a tubular housing and a plurality of lens elements having a common optical axis, said elements including an optical element which is selectively displaceable in the direction of said optical axis and over a predetermined axial range of adjustability, whereby depending upon the immersion substance used, a selective correction may be made for image defects arising out of the use of a particular one of said substances.

The immersion substance which completely fills the space between object and front lens of the objective may be considered as a liquid plate. When increasing the index of refraction n of such a liquid plate with respect to a nominal value, there appears a spherical overcorrection of the objective; when decreasing the index of refraction with respect to said nominal value there appears a spherical undercorrection. When changing the thickness d of such a liquid plate, the spherical overcorrection increases as the d-value increases, and decreases as the d-value decreases.

If, for example, an objective constructed according to the prior art and corrected for oil is to be used with an immersion medium of lower index of refraction (e.g., water), the thickness of the immersion space decreases by the ratio of the indicii of refraction of said substances during the focusing action of the microscope equipped with said objective. These considerations show that a spherical aberration results.

It is an object of the present invention to provide a microscope objective which can be used with different immersion substances having different indices of refraction without the result of image defects.

This object of the present invention is achieved in that the objective contains a lens group selectively displaceable in the direction of the optical axis of the objective with respect to the other lens groups of the objective, thereby influencing the spherical correction of the objective in such a way that the image errors resulting when changing the immersion liquid are compensated.

Another object of the present invention is achieved with particular advantage in that a transparent plate carried by the objective housing and positioned in axially spaced relation to the front of the front lens of the objective is provided, the distance between said plate and said front lens being selectable as one of a plurality of different distances depending upon the index of refraction of the immersion substance being used, whereby during normal focusing action of a microscope equipped with said objective, the axial space through the immersion substance to a microscopic object under examination is directly related to the refractive index of the immersion substance being used.

When changing the immersion substance between the microscope object and said front plate, the spherical aberration resulting from the changed index of refraction n is compensated by the aberration caused by the changed thickness d of the immersion space. The image field correction of the microscopic objective itself thereby is not influenced and remains the same, independent of the immersion substance used, since the objective is always used in the same way.

Said transparent front plate is designed as a planeparallel glass plate. Its thickness does not influence its effectiveness.

The new immersion objective is constructed in such a way that it includes externally accessible mechanical actuating means provided with a refractive-index scale showing markings for conventional immersion substances and serving for adjusting the distance between the front lens and said front plate. This actuating means preferably is an adjusting ring carried by the objective housing and mechanically rotatable about the optical axis of the objective. By rotating this ring, the distance between front lens and front plate is adjusted in accordance with the index of refraction n of the immersion substance used.

The invention will be explained in further detail below with reference to FIGS. 1 to 3 of the accompanying drawings, in which:

FIG. 2 shows the space between the front lens of a new immersion objective and the cover glass of an object in an enlarged section; and FIG. 3 shows the space illustrated in FIG. 2 when using an immersion substance of lower index of refraction.

Figure 1:
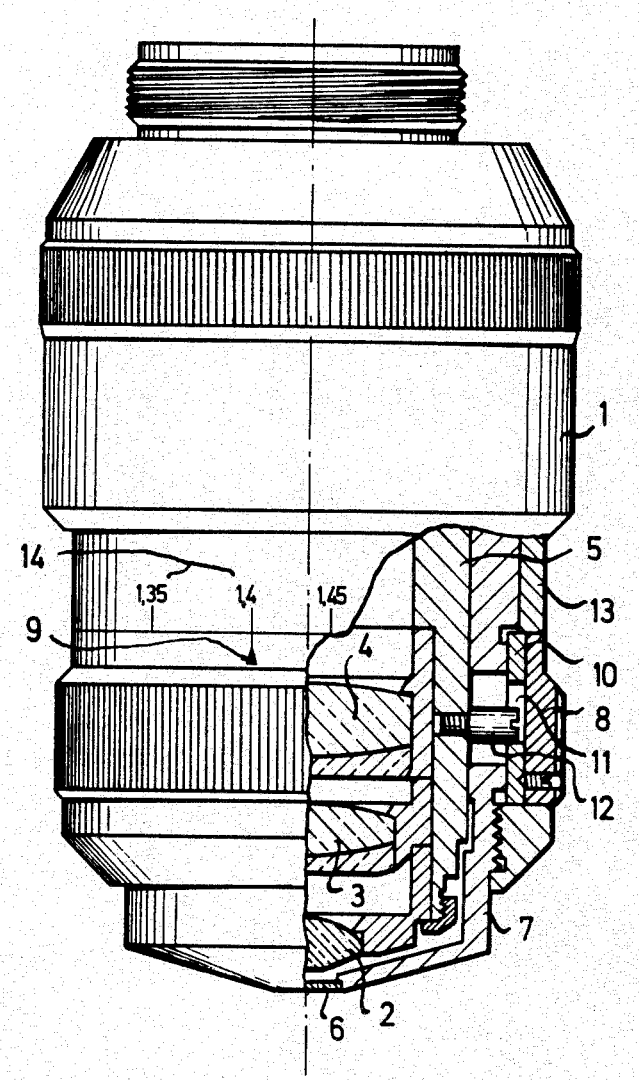
FIG. 1 is a partial section through one embodiment of the new immersion objective.

In FIG. 1, the numeral 1 denotes a microscope immersion objective comprising a front lens 2, two additional lens groups 3 and 4, and additional lens groups not shown. All lens groups are mounted in a tubular housing 5 which is movable upwards against the action of a spring (not shown) in the direction of the optical axis of the objective.

In axially spaced relation to the front of front lens 2 of the objective, there is arranged a plane-parallel glass plate 6 in a mount 7. A mechanically rotatable adjusting ring is denoted by the numeral 8 and is provided with an index mark 9. Adjustment ring 8 is connected with another ring 10 which has a slot-like cut-out 11 in the form of a cam. A pin 12, rigidly connected to the cylinder mount 5, slidably engages the cam slot of ring 10.

During rotation of adjusting ring 8, the cylinder mount 5 is moved in the direction of the optical axis via the cam disk 11 and the pin 12, in relation to the fixed mount 7 and the fixed ring 13. The ring 13 bears a refractive-index scale 14 showing marks for indicii of refraction of various immersion substances.

During rotation of adjusting ring 8, the distance between the front lens 2 and the plate 6 is changed so that the index of refraction for the immersion substance selected on scale 14 lines up with index mark 9. Then the selected immersion medium is placed in the space between the front plate 6 and the object to be observed, and focusing is accomplished by moving the objective relative to the microscopic object.

The mode of operation of the new immersion objective is explained in detail by means of FIGS. 2 and 3. In FIG. 2, the numeral 15 denotes the cover glass of an object to be examined. Between the front plate 6 of the objective 1 and the cover glass 15, there is an immersion medium 16 which in the example shown is oil with an index of refraction n=1.52. By turning the adjusting ring 8 on tubular housing of objective 1, the index mark 9 is lined up with mark 1.52 on the ring 13 which results in the distance between the front lens 2 and the front plate 6 as shown in FIG. 2. During subsequent focusing on the microscopic object, a distance $d_1$ of the immersion space results. As soon as this is achieved, a light beam 18 has the path shown in FIG. 2.

If, using the same objective 1, another immersion medium 17, for example water (n=1.33) is to be used, the adjusting ring 8 is rotated until the index mark 9 is lined up with mark 1.33 on scale 14. The distance between the front lens 2 and the front plate 6 varies in the way shown in FIG. 3, i.e., it is reduced by the extent s. During the subsequent focusing, as shown by a comparison of FIGS. 2 and 3, the object with cover glass 15 and immersion medium 17 is lifted slightly so that a distance $d_2$ of the immersion space between front plate 6 and cover glass 15 results. Distance $d_2$ is slightly larger than distance $d_1$ of the immersion space in the example of FIG. 2. Thus the spherical aberration resulting from the reduced index of refraction n of immersion substance 17 is compensated by the one caused by changing from distance $d_1$ to distance $d_2$ of the immersion space.

In case of optimum focusing, the light beam 18 shown as an example in FIGS. 2 and 3 has precisely the same path within the objective itself. This makes it evident that the image field correction of the microscope objective remains exactly the same when changing the immersion medium.

The new immersion objective also makes possible correction of the cover glass thickness. For this purpose, the adjusting ring 8 need only be rotated slightly different than shown by scale 14 and index mark 9.

With the new microscope objective it is also possible to correct for the cover glass thickness zero so that this objective can be used for examining objects with or without cover glass. With the immersion shown in FIG. 2, it makes virturally no difference whether a cover glass 15 is used, since both glass 15 and oil 16 have nearly the same index of refraction. In case of FIG. 3, with the lower refractive medium 17, the distance $d_2$ of the immersion space must be slightly increased when switching from examining an object with cover glass to examining an object without cover glass.

The objective shown in FIGS. 1 to 3 may have numerical apertures between 0.5 and 1. With objectives with a numerical aperture smaller than 0.5, the error resulting from changing the immersion substance can be practically disregarded.

The new immersion objective has a very large correction range which includes all immersion substances and reaches virtually from n=1.33 to an upper limit not further defined.

Immersion objectives according to the present invention are preferably used in fluroescence microscopy. There, it is important to use immersion substances without disturbing fluorescence of their own. When using the new objective, suitable liquids can be used as immersion substance regardless of their index of refraction. For example, it is possible to use liquid paraffin as an immersion substance. Quite generally, the new immersion objectives make the user completely independent from the immersion substance, i.e., the range of application of an immersion objective is vastly increased over conventional objectives designed for a specific immersion substance, so that the number of different immersion objectives can be reduced.

What is claimed is:

1. An immersion objective for a microscope for use with a plurality of optically different immersion substances, said objective comprising a tubular housing and a plurality of lens elements having a common optical axis, a plane-parallel front optical element carried by said housing and with respect to which said objective is selectively displaceable in the direction of said optical axis and over a predetermined axial range of adjustability, and an externally exposed refractive-index scale indicative of the displacement of said optical element; whereby, depending upon refractive index of the immersion substance used, a selective correction may be made for image defects arising out of the use of a particular one of said substances by axially displacing said objective with respect to said optical element to the appropriate refractive-index indication of said scale.

2. An immersion objective for a microscope for use with a plurality of optically different immersion substances, said objective comprising a tubular housing and a plurality of lens elements including a front lens facing an object to be observed, all said lens elements having a common optical axis, a plane-parallel transparent plate carried by said housing and positioned in axially spaced relation to the front of said front lens, the distance between said plate and said front lens being selectable as one of a plurality of different distances depending upon the index of refraction of the immersion substances being used, an externally exposed scale calibrated to display index of refraction as a function of said selectable distance, whereby during normal focusing action of a microscope equipped with said objective, and having used said scale to preset said distance appropriate to the applicable index of refraction, the axial space through the immersion substance to a microscope object under examination is directly related to the refractive index of the immersion substance being used.

3. An immersion objective according to claim 2, in which said transparent plate is of plane-parallel glass.

4. An immersion objective according to claim 3, in which the thickness of said transparent plate is small compared to the diameter of said front lens.

5. An immersion objective according to claim 2, including externally accessible mechanical actuating means for movably positioning said plate to select a given one of said different distances.

6. An immersion objective according to claim 5, in which said mechanical means is an adjusting ring carried by said housing and manually rotatable about the optical axis of the objective.

7. An immersion objective for a microscope, comprising a tubular lens housing having means at one end for removable attachment to a microscope body, a plurality of objective-lens elements carried by and within said housing, the outer surface of the element most remote from said one end being adapted for immersion contact with a liquid medium through which a microscopic object is to be observed, one of said elements being a plane-parallel plate axially adjustable with respect to other of said elements, a refractive-index scale associated with said axially adjustable element to indicate the adjusted position thereof in terms of the applicable index of refraction, whereby when said objective is brought into immersion contact with one of a plurality of liquids having different optical-transmission characteristics, and when said adjustment is made to the scale indication for the index of refraction of said one liquid, a corrective focus adjustment will have been made by repositioning said one element without changing the focal setting of the microscope to which said one housing end is mounted.

8. An objective according to claim 7, in which externally accessible control means on said housing is connected to adjustably position said one element.

9. An objective according to claim 7, in which said most-remote element is a plane-surface transparent plate.

10. An objective according to claim 7, in which said one element is said most-remote element.

11. An immersion objective according to claim 7, in which the remainder of said objective-lens elements are axially fixed with respect to each other.

* * * * *